United States Patent
Fei et al.

(10) Patent No.: US 12,344,242 B2
(45) Date of Patent: Jul. 1, 2025

(54) PRECAUTIONARY VEHICLE PATH PLANNING

(71) Applicant: Zenseact AB, Gothenburg (SE)

(72) Inventors: Zhennan Fei, Gothenburg (SE); Gabriel Rodrigues De Campos, Gothenburg (SE)

(73) Assignee: Zenseact AB, Gothenburg (SE)

( * ) Notice: Subject to any disclaimer, the term of this patent is extended or adjusted under 35 U.S.C. 154(b) by 319 days.

(21) Appl. No.: 17/698,088

(22) Filed: Mar. 18, 2022

(65) Prior Publication Data
US 2022/0306154 A1 Sep. 29, 2022

(30) Foreign Application Priority Data
Mar. 24, 2021 (EP) .................................. 21164687

(51) Int. Cl.
*B60W 30/095* (2012.01)
*B60W 10/18* (2012.01)
(Continued)

(52) U.S. Cl.
CPC ........ *B60W 30/0956* (2013.01); *B60W 30/09* (2013.01); *B60W 30/095* (2013.01);
(Continued)

(58) Field of Classification Search
CPC ............. B60W 30/0956; B60W 30/09; B60W 30/095; B60W 40/06; B60W 40/08;
(Continued)

(56) References Cited

U.S. PATENT DOCUMENTS 9,248,834 B1 * 2/2016 Ferguson .............. B60W 30/09
10,386,836 B2 * 8/2019 Lockwood ........... G05D 1/0027
(Continued)

FOREIGN PATENT DOCUMENTS

| EP | 2921362 A1 | 9/2015 | | |
|---|---|---|---|---|
| GB | 2579023 A | 6/2020 | | |
| JP | 2022114191 A | * | 8/2022 | ............ B60W 30/10 |
| KR | 20200029049 A | * | 3/2020 | ............ B60W 40/06 |

OTHER PUBLICATIONS

Translation of KR-20200029049-A, 62 pages (Year: 2020).*
(Continued)

*Primary Examiner* — Dale W Hilgendorf
(74) *Attorney, Agent, or Firm* — Weisberg I.P. Law, P.A.

(57) ABSTRACT

A path-adapting system for precautionary path planning of a host vehicle. The path-adapting system determines conditions of a liquid and/or solid loose material in the air and/or on the road surface in vicinity of the host vehicle, determines movement attributes in relation to the host vehicle of at least a first object in host vehicle surroundings, determines based on the conditions and movement attributes, at least a first estimated upcoming host vehicle position occurring at an estimated upcoming at least first time instance at which the at least first detected object is estimated to direct the material onto the host vehicle and/or the host vehicle is estimated to direct the material onto the at least first detected object, and determines a driving path, altering for the at least first time instance the at least first estimated upcoming host vehicle position to a modified host vehicle position.

16 Claims, 9 Drawing Sheets

(51) Int. Cl.
*B60W 10/20* (2006.01)
*B60W 30/09* (2012.01)
*B60W 30/14* (2006.01)
*B60W 40/06* (2012.01)
*B60W 40/08* (2012.01)
*B60W 50/00* (2006.01)
*B60W 50/14* (2020.01)
*B60W 60/00* (2020.01)

(52) U.S. Cl.
CPC ............ *B60W 40/06* (2013.01); *B60W 40/08* (2013.01); *B60W 50/0097* (2013.01); *B60W 50/14* (2013.01); *B60W 60/0011* (2020.02); *B60W 60/0015* (2020.02); *B60W 60/0027* (2020.02); *B60W 10/18* (2013.01); *B60W 10/20* (2013.01); *B60W 30/143* (2013.01); *B60W 2040/0818* (2013.01); *B60W 2050/146* (2013.01); *B60W 2510/202* (2013.01); *B60W 2540/229* (2020.02); *B60W 2555/20* (2020.02)

(58) Field of Classification Search
CPC ............ B60W 50/0097; B60W 50/14; B60W 60/0011; B60W 60/0015; B60W 60/0027; B60W 10/18; B60W 10/20; B60W 30/143; B60W 2040/0818; B60W 2050/146; B60W 2510/202; B60W 2540/229; B60W 2555/20
See application file for complete search history.

(56) References Cited

U.S. PATENT DOCUMENTS

| | | | | |
|---|---|---|---|---|
| 10,759,422 | B2* | 9/2020 | You | B60W 30/18154 |
| 11,521,127 | B2* | 12/2022 | Zhou | G05D 1/247 |
| 11,521,130 | B2* | 12/2022 | Zhou | G06N 3/045 |
| 11,775,870 | B2* | 10/2023 | Zhou | G05D 1/0255 |
| | | | | 706/12 |
| 2013/0190944 | A1* | 7/2013 | Brandin | G01C 21/26 |
| | | | | 701/1 |
| 2013/0290876 | A1* | 10/2013 | Anderson | G06T 19/006 |
| | | | | 715/761 |
| 2015/0266488 | A1* | 9/2015 | Solyom | B60W 10/04 |
| | | | | 701/28 |
| 2020/0269864 | A1* | 8/2020 | Zhang | G08G 1/165 |
| 2020/0290624 | A1* | 9/2020 | Kumano | B60W 40/06 |
| 2021/0016793 | A1* | 1/2021 | Yamaguchi | B60K 35/81 |
| 2021/0163021 | A1* | 6/2021 | Frazzoli | H04W 4/48 |
| 2021/0383269 | A1* | 12/2021 | Zhou | B60W 60/0015 |
| 2022/0126864 | A1* | 4/2022 | Moustafa | B60W 40/04 |
| 2023/0174115 | A1* | 6/2023 | Fei | B60W 50/14 |
| 2023/0373516 | A1* | 11/2023 | Won | B60K 35/223 |

OTHER PUBLICATIONS

Translation of JP-2022114191-A, 41 pages (Year: 2022).*
EPO Communication and European Search Report dated Oct. 11, 2021 for Patent Application No. 21164687.2 filed March 224, 2021, consisting of 8-pages.

* cited by examiner

PRECAUTIONARY VEHICLE PATH PLANNING

CROSS REFERENCE TO RELATED APPLICATION

This Application is related to and claims priority to European Patent Application No. 21164687.2, filed Mar. 24, 2021, entitled PRECAUTIONARY VEHICLE PATH PLANNING the entirety of which is incorporated herein by reference.

TECHNICAL FIELD

The present disclosure relates to precautionary path planning of a vehicle.

BACKGROUND

Within the automotive field, there has for quite some years been activity in development of autonomous vehicles. An increasing number of modern vehicles have advanced driver-assistance systems, ADAS, to increase vehicle safety and more generally road safety. ADAS—which for instance may be represented by adaptive cruise control, ACC, collision avoidance system, forward collision warning, etc.—are electronic systems that may aid a vehicle driver while driving. Moreover, in a not too distant future, Autonomous Driving, AD, will to greater extent find its way into modern vehicles. AD along with ADAS will herein be referred to under the common term Automated Driving System, ADS, corresponding to all of different levels of automation, for instance as defined by the SAE J3016 levels (0-5) of driving automation. An ADS may be construed as a complex combination of various components that can be defined as systems where perception, decision making, and operation of the vehicle—at least in part—are performed by electronics and machinery instead of a human driver. This may include handling of the vehicle, destination, as well as awareness of surroundings. While the automated system has control over the vehicle, it allows the human operator to leave all or at least some responsibilities to the system. To perceive its surroundings, an ADS commonly combines a variety of sensors, such as e.g. radar, LIDAR, sonar, camera, navigation and/or positioning system e.g. GNSS such as GPS, odometer and/or inertial measurement units, upon which advanced control systems may interpret sensory information to identify appropriate navigation paths, as well as obstacles and/or relevant signage.

During driving, surrounding detecting sensors—for instance cameras—of such an ADS-provided vehicle and/or a windshield thereof may, as similar to a conventional vehicle without ADS, during certain circumstances—such as for instance due to precipitation—to some extent become temporarily obstructed. With at least partly blinded surrounding detecting sensors, functionality of the ADS may be affected, and further, with an at least partly opaque windshield, even in an automated driving mode, suddenly being blinded for e.g. a fraction of a second or a few seconds might cause a driver of the vehicle to become uneasy and hastily intervene in an unfavorable manner. Similarly, with an at least partly opaque windshield in a manual driving mode, due to the driver's inability to see through the windshield for e.g. a fraction of a second or a few seconds, the driver's ability to safely handle the vehicle may be affected. Although it is known in the art to adapt a vehicle path and/or path planning—e.g. of an ADS-provided vehicle—in view of detected opaqueness of the vehicle's windshield and/or surrounding detecting sensor(s), such as for instance by slowing down, there is still a need for improved adaptation of vehicle paths and/or path planning in situations where obstructed windshields and/or surrounding detecting sensors may arise.

SUMMARY OF THE INVENTION

It is therefore an object of embodiments herein to provide an approach for in an improved and/or alternative manner provide path planning—such as precautionary path planning—of a host vehicle.

The object above may be achieved by the subject-matter disclosed herein. Embodiments are set forth in the appended claims, in the following description and in the drawings.

The disclosed subject-matter relates to a method performed by a path-adapting system for precautionary path planning of a host vehicle. The path-adapting system determines conditions of a liquid and/or solid loose material in the air and/or on the road surface in vicinity of the host vehicle based on collected input data. The path-adapting system further determines movement attributes in relation to the host vehicle, of at least a first object in host vehicle surroundings captured with support from one or more surrounding detecting sensors onboard the host vehicle. Moreover, the path-adapting system determines based on the conditions and the movement attributes, at least a first estimated upcoming host vehicle position occurring at an estimated upcoming at least first time instance at which the at least first detected object is estimated to direct the material onto the host vehicle and/or the host vehicle is estimated to direct the material onto the at least first detected object. Furthermore, the path-adapting system determines a driving path intended for the host vehicle, altering for the at least first time instance the at least first estimated upcoming host vehicle position to a modified host vehicle position mitigating the estimated directing of the material.

The disclosed subject-matter further relates to a path-adapting system for precautionary path planning of a host vehicle. The path-adapting system comprises a conditions determining unit for determining conditions of a liquid and/or solid loose material in the air and/or on the road surface in vicinity of the host vehicle, based on collected input data. The path-adapting system further comprises a movement determining unit for determining movement attributes in relation to the host vehicle, of at least a first object in host vehicle surroundings captured with support from one or more surrounding detecting sensors onboard the host vehicle. Moreover, the path-adapting system comprises an upcoming risk determining unit for determining based on the conditions and the movement attributes, at least a first estimated upcoming host vehicle position occurring at an estimated upcoming at least first time instance at which the at least first detected object is estimated to direct the material onto the host vehicle and/or the host vehicle is estimated to direct the material onto the at least first detected object. Furthermore, the path-adapting system comprises a driving path determining unit for determining a driving path intended for the host vehicle, altering for the at least first time instance the at least first estimated upcoming host vehicle position to a modified host vehicle position mitigating the estimated directing of the material.

Furthermore, the disclosed subject-matter relates to a vehicle comprising a path-adapting system as described herein.

Moreover, the disclosed subject-matter relates to a computer program product comprising a computer program containing computer program code means arranged to cause a computer or a processor to execute the steps of the path-adapting system described herein, stored on a computer-readable medium or a carrier wave.

The disclosed subject-matter further relates to a non-volatile computer readable storage medium having stored thereon the computer program product.

Thereby, there is introduced an approach according to which a temporary vehicle path is provided introducing preventive safety actions. That is, since there is determined conditions of a liquid and/or solid loose material in the air and/or on the road surface in vicinity of a host vehicle based on collected input data, there is established from derived data indicative of current or essentially current conditions, circumstances concerning loose matter such as for instance precipitation—e.g. remaining on the road surface—and/or such as for instance a pool of fluids and/or water on the road e.g. from flooding, in the surroundings of the host vehicle. Thus, the path-adapting system may learn of detected and/or estimated levels and/or amounts—and/or existence or occurrence—of liquid and/or solid loose material such as for instance rain, snow and/or hail—and/or other loose matter—in the air or on the road near the host vehicle. Moreover, that is, since there is determined movement attributes in relation to the host vehicle, of at least a first object in host vehicle surroundings captured with support from one or more surrounding detecting sensors onboard the host vehicle, there is established for one or more surrounding objects—for instance other vehicles—their respective motion pattern, such as horizontal and/or vertical distance, velocity and/or orientation, relative the host vehicle. Furthermore, that is, since there is determined based on the conditions and the movement attributes, at least a first estimated upcoming host vehicle position occurring at an estimated upcoming at least first time instance at which the at least first detected object is estimated to direct the material onto the host vehicle—optionally onto at least a portion of a windshield of the host vehicle—and/or the host vehicle is estimated to direct the material onto the at least first detected object—optionally onto at least a portion of a windshield of the at least first detected object—there is estimated by analysing the determined conditions of the liquid and/or solid loose material in the air and/or on the road surface in vicinity of the host vehicle in view of the determined movement attributes of the at least first object—e.g. another vehicle—an upcoming position and/or positions of the host vehicle at an upcoming moment in time and/or time duration at and/or during which there is deemed to be a risk for the at least first object to cause at least a portion of the liquid and/or solid loose material—e.g. precipitation remaining on the road—to be directed onto the host vehicle, and/or vice versa, i.e. a risk for the host vehicle to cause at least a portion of the liquid and/or solid loose material to be directed onto the at least first object. Accordingly, it may be established an upcoming situation and/or scenario where interaction with the liquid and/or solid loose material by the at least first object's motion may implicate the material being e.g. cascaded, splashed, projected and/or swirled up onto the host vehicle and/or the material being caused to soak, cloud and/or cover the host vehicle—for instance obstructing at least a portion of a windshield and/or surrounding detecting sensor thereof—and/or where interaction with the liquid and/or solid loose material by the host vehicle's motion may implicate the material being e.g. cascaded, splashed, projected and/or swirled up onto the at least first object and/or the material being caused to soak, cloud and/or cover the at least first object, for instance in a similar manner obstructing at least a portion of a windshield and/or surrounding detecting sensor thereof or for instance being directed onto a vulnerable road user. Moreover, that is, since there is determined a driving path intended for the host vehicle, altering for the at least first time instance the at least first estimated upcoming host vehicle position to a modified host vehicle position mitigating the estimated directing of the material, there is established a trajectory for the host vehicle according to which the expected upcoming host vehicle position is avoided and an altered position for the host vehicle suggested for the at least first time instance. Thus, with the proactive approach of the inventive concept, there is provided and/or generated a driving path according to which the expected scenario and/or situation of the at least first object directing liquid and/or solid loose material onto the host vehicle—and/or the host vehicle directing the same onto the at least first object—at the at least first upcoming host vehicle position, may be avoided and/or alleviated.

For that reason, an approach is provided for in an improved and/or alternative manner provide path planning—such as precautionary path planning—of a host vehicle.

The technical features and corresponding advantages will be discussed in further detail in the following.

BRIEF DESCRIPTION OF THE DRAWINGS

The various aspects of the non-limiting embodiments, including particular features and advantages, will be readily understood from the following detailed description and the accompanying drawings, in which.

DETAILED DESCRIPTION

Figure 1:
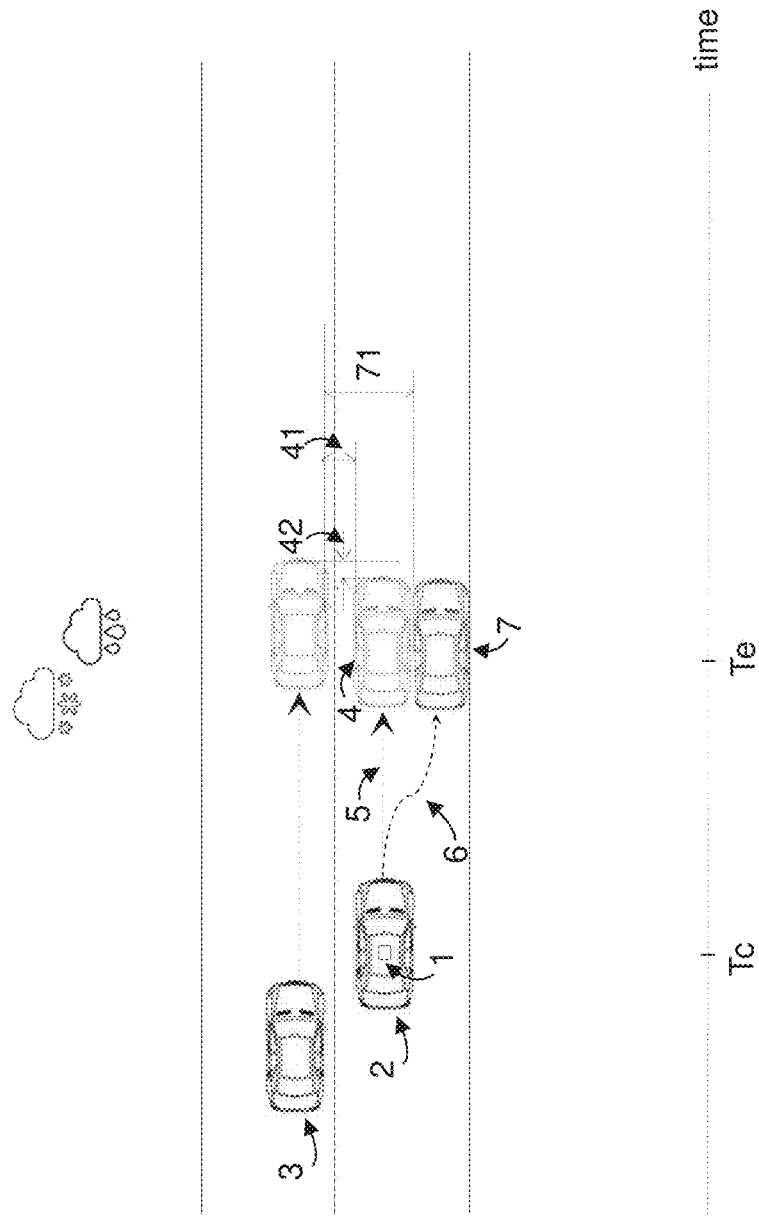
FIG. 1 illustrates a schematic view of an exemplifying path-adapting system according to embodiments of the disclosure in view of a first exemplifying driving scenario.

Non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate precautionary path planning of a host vehicle, there will be disclosed an approach according to which a temporary vehicle path is provided introducing preventive safety actions.

Figure 6:
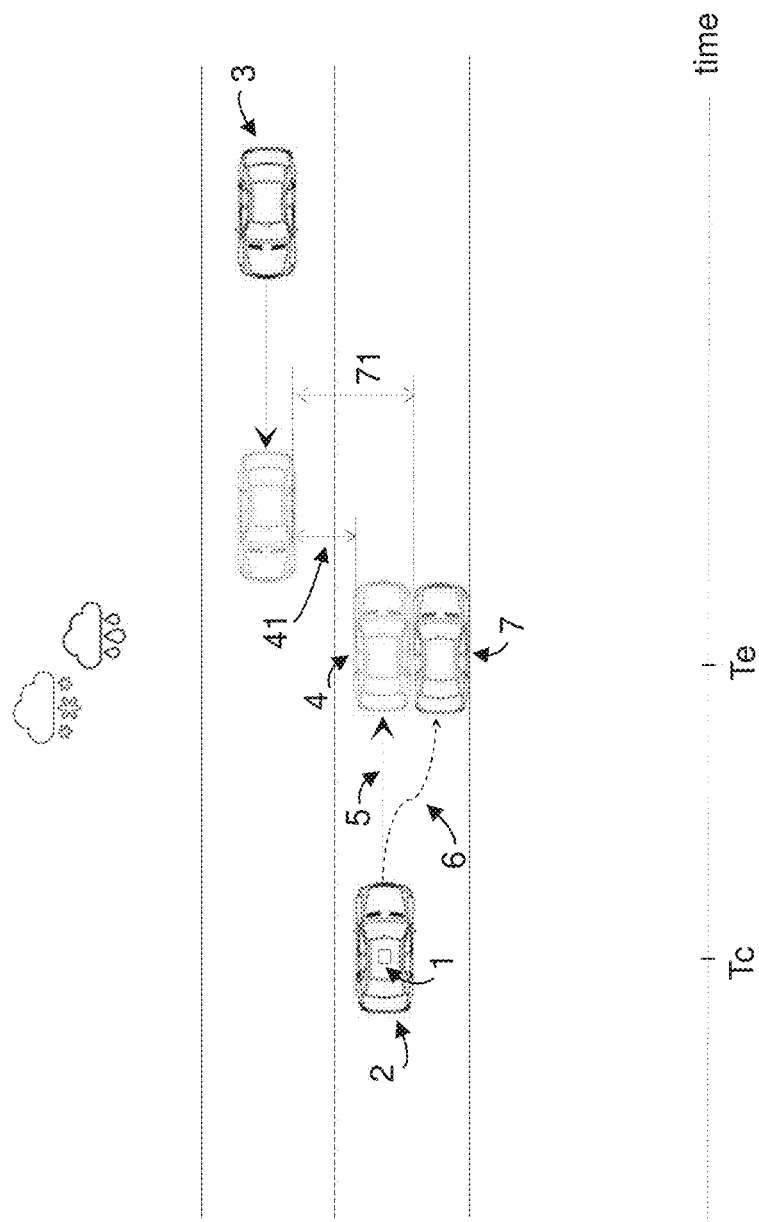
FIG. 6 illustrates a schematic view of an exemplifying path-adapting system according to embodiments of the disclosure in view of a sixth exemplifying driving scenario.
Figure 7:
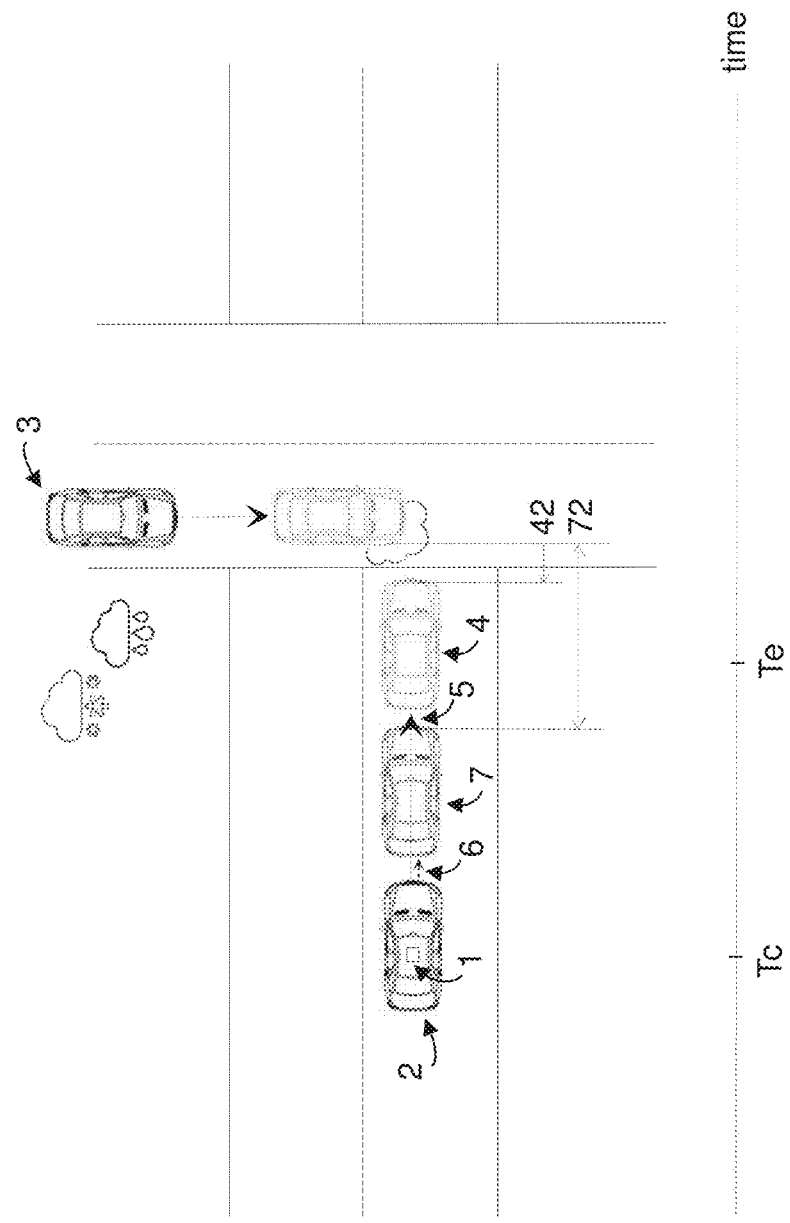
FIG. 7 illustrates a schematic view of an exemplifying path-adapting system according to embodiments of the disclosure in view of a seventh exemplifying driving scenario.
Figure 8:
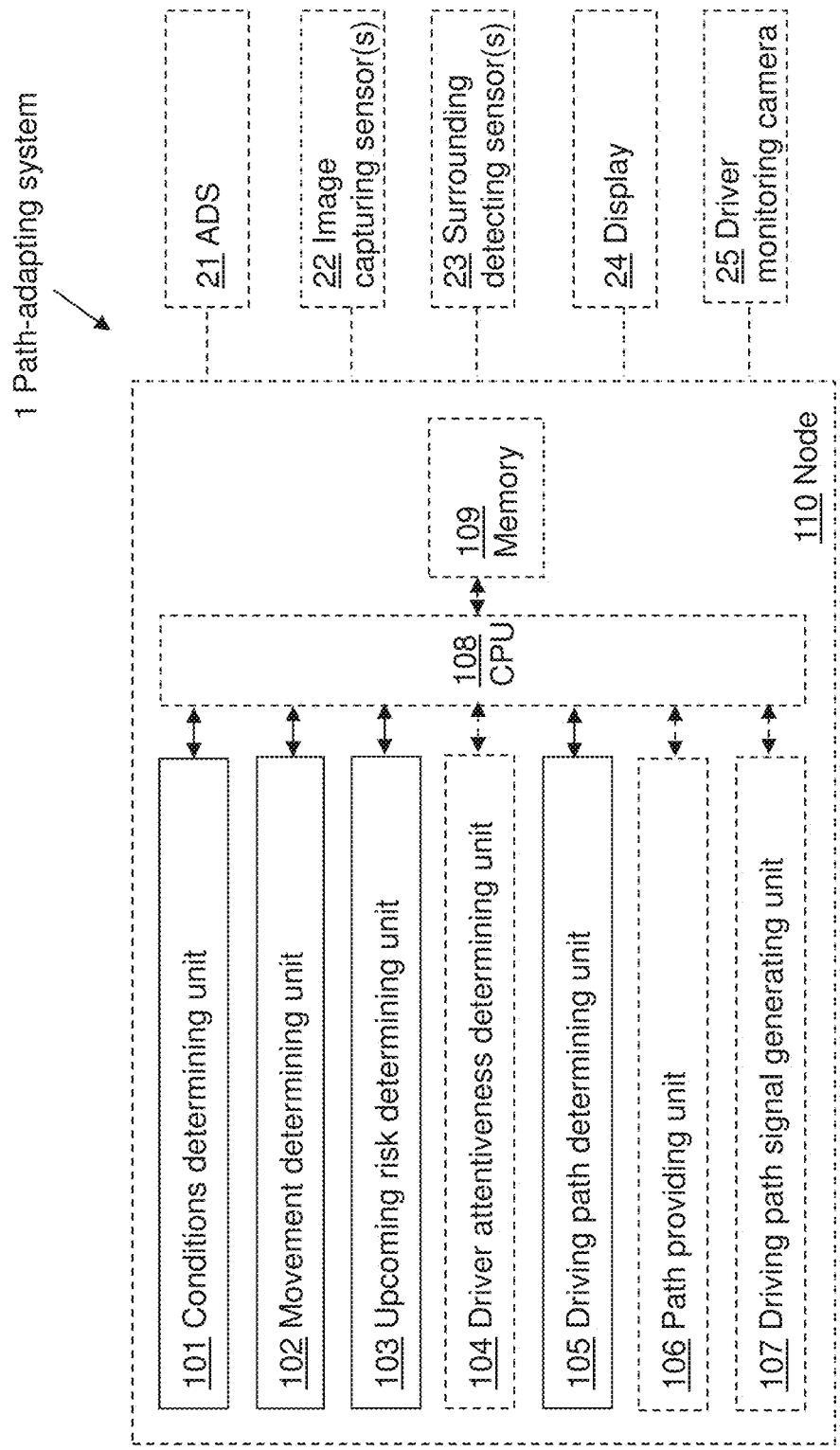
FIG. 8 is a schematic block diagram illustrating an exemplifying path-adapting system according to embodiments of the disclosure.

Referring now to the figures, there is depicted in FIGS. 1-7 respective schematic views of an exemplifying path-adapting system 1 according to embodiments of the disclosure in view of differing exemplifying driving scenarios and/or situations, whereas there in FIG. 8 is depicted a schematic block diagram illustrating such an exemplifying path-adapting system 1 according to embodiments of the disclosure. As indicated above, the path-adapting system 1 is adapted for precautionary path planning of a host vehicle 2. The phrase "path-adapting system" may refer to "path-adapting system of a host vehicle" and/or "assessment system", whereas "for precautionary path planning" may refer to merely "for path planning", "for supporting path planning", "for precautionary risk-reducing path planning", "for precautionary loose material influenced path planning" and/or "for precautionary loose material affected path planning". Moreover, according to an example, "for precautionary path planning" may further refer to "for precautionary path planning to avoid and/or mitigate occurrence of an at least partly opaque and/or obstructed windshield and/or surrounding detecting sensor e.g. image capturing sensor", "for precautionary path planning mitigating risks associated with and/or rendered from an at least partly opaque and/or obstructed windshield and/or surrounding detecting sensor e.g. image capturing sensor" and/or "for avoiding and/or mitigating occurrence of an at least partly opaque and/or obstructed windshield and/or surrounding detecting sensor e.g. image capturing sensor". The phrase "of a host vehicle", on the other hand, may according to an example refer to "of an automated driving system, ADS, of a host vehicle".

The exemplifying host vehicle 2 may be represented by any arbitrary—e.g. known—manned or unmanned vehicle, for instance an engine-propelled or electrically-powered vehicle such as a car, truck, lorry, van, bus and/or tractor. Moreover, the term "host vehicle" may refer to merely "vehicle", and further to "autonomous and/or at least partly autonomous vehicle", "driverless and/or at least partly driverless vehicle", and/or "self-driving and/or at least partly self-driving vehicle". The host vehicle 2 may accordingly comprise and/or have onboard an ADS 21, i.e. Automated Driving System, which ADS 21 may refer to any arbitrary ADS, advanced driver-assistance system, ADAS, and/or automated driving, AD, system e.g. known in the art and/or yet to be developed. Moreover, the host vehicle 2 and/or the ADS 21 may comprise, be provided with and/or have onboard an optional perception system (not shown) and/or similar system and/or functionality adapted to estimate surroundings of the host vehicle 2, and subsequently adapted to estimate world views of the surroundings e.g. with support from a—e.g. commonly known—digital map such as a high definition, HD, map, and/or an equivalent and/or successor thereof. Such an exemplifying perception system or similar system may refer to any commonly known system and/or functionality, e.g. comprised in one or more electronic control modules, ECUs, and/or nodes of the host vehicle 2 and/or the ADS 21, adapted and/or configured to interpret sensory information—relevant for driving of the host vehicle 2—to identify e.g. objects such as other vehicles, pedestrians, bicycles etc., obstacles, the road environment such as lane marker, road edges, barriers etc., vehicle lanes, relevant signage, appropriate navigation paths etc. The exemplifying perception system or similar system—which may be adapted to support e.g. sensor fusion, tracking, localization etc.—may thus be adapted to rely on sensory information. Such exemplifying sensory information may for instance be derived from one or more—e.g. commonly known—sensors comprised in and/or provided onboard the host vehicle 2 adapted to sense and/or perceive the host vehicle's 2 whereabouts and/or surroundings, for instance represented by one or a combination of one or more of surrounding detecting sensors, such as image capturing devices e.g. cameras, radar, lidar, ultrasonics etc., and/or a positioning system, odometer, inertial measurement units etc.

The path-adapting system 1 is—e.g. by means of a conditions determining unit 101—adapted and/or configured for determining conditions of a liquid and/or solid loose material in the air and/or on the road surface in vicinity of the host vehicle 2 based on collected input data. Thereby, there is established from derived data indicative of current or essentially current conditions, circumstances concerning loose matter such as for instance precipitation—e.g. remaining on the road surface—and/or such as for instance a pool of fluids and/or water on the road e.g. from flooding, in the surroundings of the host vehicle 2. Thus, the path-adapting system 1 may learn of detected and/or estimated levels and/or amounts—and/or existence or occurrence—of liquid and/or solid loose material such as for instance rain, snow and/or hail—and/or other loose matter—in the air or on the road near the host vehicle 2. In exemplifying FIGS. 1-7, respectively, there is in an exemplifying manner depicted to be liquid and/or solid loose material—for instance represented by precipitation—in the air and/or on the road surface to a respective certain extent and/or level and/or at a certain position and/or location. Thus, in view of exemplifying FIGS. 1-7, there may hence in an exemplifying manner be determined respective liquid and/or solid loose material conditions given respective exemplifying circumstances.

Determining conditions of a liquid and/or solid loose material in the air and/or on the road surface in vicinity of the host vehicle 2 based on collected input data, may be accomplished in any feasible manner. For instance, the input data may be determined with support from one or more sensors e.g. onboard the host vehicle 2 such as—as illustrated in an exemplifying manner in FIG. 8—image capturing sensors 22 e.g. cameras and/or of cameras, gathering the input data, and/or retrieving the input data—e.g. via V2X communication (not shown)—from one or more off-board entities, such as another sensor-provided vehicle, a cloud server, a local—e.g. sensor-provided—infrastructure element, and/or a metrological institute providing weather-related data, etc. The collected input data, on the other hand, may be represented by any feasible information indicative of the liquid and/or solid loose material, and further be of any feasible format. Furthermore, the liquid and/or solid loose material may be represented by any feasible loose matter of any arbitrary composition and/or structure—e.g. by a combination of liquid and solid material, a semi-liquid material and/or semi-solid material—and further of any feasible size and/or dimensions. The liquid and/or solid loose material may accordingly be represented by for instance precipitation—or at least to some extent precipitation—such as rain, snow, hail etc. and/or pools, drifts, layers and/or collections thereof and/or e.g. snow dust, and/or liquid/solid loose matter non-related—at least to some extent—to precipitation, for instance represented by essentially liquid such as water e.g. sprung from a broken pipe and/or flooding, represented by dust and/or represented by for instance essentially solid matter such as a piece of cardboard, tarpaulin, etc. Moreover, the determined conditions of the liquid and/or solid loose material may be represented by any arbitrary feasible established and/or estimated circumstances concerning the liquid and/or solid loose material, such as amount(s), level(s), magnitude, extent, degree and/or quantity thereof for instance on the road surface, size(s) and/or dimension(s) thereof, composition(s) and/or structure(s) thereof, position(s) and/or location(s) thereof, etc. Furthermore, liquid and/or solid loose material in vicinity of the host vehicle 2 may be represented by liquid and/or solid loose material within any feasible distance from the host vehicle 2, such as within sensor range and/or within a predeterminable distance—e.g. within 1000, 500 or 100 metres—therefrom, and/or in any feasible direction of the host vehicle 2, such as for instance essentially in a heading direction and/or side directions thereof.

The phrase "determining conditions of a liquid and/or solid loose material" may refer to "detecting and/or deriving conditions of a liquid and/or solid loose material", "determining current conditions of a liquid and/or solid loose material" and/or "determining occurrence and/or existence of a liquid and/or solid loose material". The phrase "liquid and/or solid loose material", on the other hand, may refer to "liquid and/or solid material not part of, fixedly attached to and/or integrated with a road and/or infrastructure", merely "liquid and/or solid material" and/or merely "loose material", whereas "material" may refer to "matter, substance and/or medium e.g. precipitation". Moreover, "in the air and/or on the road surface" may refer to "in at least a portion of the air and/or on at least a portion of the road surface" and/or "in the air and/or on a road surface". According to an example, the phrase "determining conditions of a liquid and/or solid loose material in the air and/or on the road surface" may refer to "determining and/or estimating a level of a liquid and/or solid loose material—e.g. precipitation—on and/or remaining on the road surface". Furthermore, the phrase "in vicinity of the host vehicle" may refer to "within a predeterminable distance of the host vehicle", and according to an example further to "within sensor range of the host vehicle" and/or "in vicinity of the host vehicle at least in an essentially heading direction and/or essentially side directions thereof". The phrase "based on collected input data", on the other hand, may refer to "derived, calculated and/or estimated from collected input data", "based on retrieved and/or gathered input data" and/or "based on collected data indicating liquid and/or solid loose material". According to an example, "based on collected input data" may further refer to "based on collected input data gathered with support from one or more onboard sensors e.g. image capturing sensors and/or retrieved—e.g. via V2X communication—from other entities such as another vehicle e.g. sensor-provided vehicle, a cloud server e.g. an automotive cloud, a local infrastructure element, and/or a metrological institute providing weather-related data", and further to "based on collected input data indicating precipitation in the air and/or level or amount of liquid and/or solid loose material e.g. precipitation on a road surface".

The path-adapting system 1 is further—e.g. by means of a movement determining unit 102—adapted and/or configured for determining movement attributes in relation to the host vehicle 2, of at least a first object 3 in host vehicle surroundings captured with support from one or more surrounding detecting sensors 23 onboard the host vehicle 2. Thereby, with assistance from at least a first sensor 23 adapted to capture surroundings of the host vehicle 2, there is established for one or more surrounding objects 3—for instance other vehicles—their respective motion pattern, such as horizontal and/or vertical distance, velocity and/or orientation, relative the host vehicle 2. In exemplifying FIGS. 1-7, respectively, there is in an exemplifying manner depicted to be a respective at least first object 3—here represented by another vehicle—in vicinity of respective host vehicle 2. Thus, in view of exemplifying FIGS. 1-7, there may hence in an exemplifying manner be determined respective movement attributes of respective first object 3 relative the host vehicle 2.

Determining movement attributes of at least a first object 3 may be accomplished in any feasible—e.g. known—manner, such as by object detection and/or tracking by processing and/or analyzing data captured by the one or more surrounding detecting sensors 23. The surrounding detecting sensor(s) 23 may be represented by any sensor(s) adapted to capture surroundings of the host vehicle 2, and may for instance be represented by one or a combination of image capturing device(s)—such as the image capturing sensor(s) 22 discussed above—e.g. camera(s), and/or radar, lidar, ultrasonics etc. The at least first object 3, on the other hand, which may be referred to as a potential threat object, may be represented by any feasible road user and/or dynamic object near a road, for instance another vehicle and/or vulnerable road user such as a pedestrian or cyclist. Moreover, the movement attributes of the at least first object 3 may be represented by any feasible motion characteristics and/or pattern of the object 3 in relation to the host vehicle 2, such as its determined and/or estimated horizontal and/or vertical distance, velocity, acceleration/deceleration and/or orientation in relation to the host vehicle 2. The phrase "determining movement attributes in relation to the host vehicle of at least a first object" may refer to "calculating, estimating and/or deriving movement attributes in relation to the host vehicle of at least a first object" and/or "determining—in addition to predicting movement, motion and/or path of the host vehicle—movement attributes in relation to the host vehicle of at least a first object", whereas "movement attributes" may refer to "motion attributes" and/or "movement pattern, properties and/or characteristics". According to an example, "determining movement attributes in relation to the host vehicle" may further refer to "determining movement attributes comprising horizontal and/or vertical distance, velocity and/or orientation in relation to the host vehicle". Moreover, according to an example, the phrase "determining movement attributes [ . . . ] of at least a first object" may refer to "determining movement attributes [ . . . ] of at least a first road user" and/or "determining movement attributes [ . . . ] of at least a first dynamic and/or moving object". The phrase "determining movement attributes in relation to the host vehicle", on the other hand, may refer to "determining movement attributes relative and/or in view of the host vehicle". Moreover, "in host vehicle surroundings" may refer to "within sensor range and/or within a predeterminable distance from the host vehicle, such as within 500, 300 or 100 meters thereof" and according to an example further to "in vehicle surroundings positioned in essentially a heading direction and/or side directions of the host vehicle".

The path-adapting system 1 is further—e.g. by means of an upcoming risk determining unit 103—adapted and/or configured for determining based on the conditions and the movement attributes, at least a first estimated upcoming host vehicle position 4 occurring at an estimated upcoming at least first time instance Te at which the at least first detected object 3 is estimated to direct the material onto the host vehicle 2—optionally onto at least a portion of a windshield of the host vehicle 2—and/or the host vehicle 2 is estimated to direct the material onto the at least first detected object 3, optionally onto at least a portion of a windshield of the at least first detected object 3. Thereby, there is estimated by analysing the determined conditions of the liquid and/or solid loose material in the air and/or on the road surface in vicinity of the host vehicle 2 in view of the determined movement attributes of the at least first object 3—e.g. another vehicle—an upcoming position and/or positions 4 of the host vehicle 2 at an upcoming moment in time and/or time duration Te at and/or during which there is deemed to be a risk for the at least first object 3 to cause at least a portion of the liquid and/or solid loose material—e.g. precipitation remaining on the road—to be directed onto the host vehicle 2, and/or vice versa, i.e. a risk for the host vehicle 2 to cause at least a portion of the liquid and/or solid loose material to be directed onto the at least first object 3. Accordingly, it may be established an upcoming situation and/or scenario where interaction with the liquid and/or solid loose material by the at least first object's 3 motion may implicate the material being e.g. cascaded, splashed, projected and/or swirled up onto the host vehicle 2 and/or the material being caused to soak, cloud and/or cover the host vehicle 2—for instance obstructing at least a portion of a windshield and/or surrounding detecting sensor 23 thereof—and/or where interaction with the liquid and/or solid loose material by the host vehicle's 2 motion may implicate the material being e.g. cascaded, splashed, projected and/or swirled up onto the at least first object 3 and/or the material being caused to soak, cloud and/or cover the at least first object 3, for instance in a similar manner obstructing at least a portion of a windshield and/or surrounding detecting sensor 23 thereof or for instance being directed onto a vulnerable road user. In exemplifying FIGS. 1-7, respectively, there is in an exemplifying manner depicted that respective at least first object 3 is at risk of directing solid and/or liquid loose material onto respective host vehicle 2 and/or that respective host vehicle 2 is at risk of directing solid and/or liquid loose material onto respective at least first object 3. Thus, in view of exemplifying FIGS. 1-7, there may hence based on the conditions and the movement attributes, in an exemplifying manner be determined—at a respective exemplifying current time instance Tc—respective estimated upcoming vehicle positions 4 occurring at respective at least first time instances Te at which respective at least first detected object 3 is estimated to direct the material onto respective host vehicle 2 and/or respective host vehicle 2 is estimated to direct the material onto respective at least first detected object 3.

An expected upcoming vehicle trajectory and/or path 5 of the host vehicle 2 may be estimated and/or determined in any feasible—e.g. known—manner, and for instance be derivable from—and/or with support from—the ADS 21 discussed above. An expected upcoming vehicle trajectory and/or path of the at least first object 3 may similarly be estimated and/or determined in any feasible—e.g. known—manner, taking into consideration the determined movement attributes thereof. In view thereof, determining the at least a first estimated upcoming host vehicle position 4 at which the at least first detected object 3 is estimated to direct the material onto the host vehicle 2 and/or the host vehicle 2 is estimated to direct the material onto the at least first detected object 3, may be accomplished in any feasible manner by considering and/or analysing the established conditions of the liquid and/or solid loose material in view of the established movement attributes of the at least first object 3. For instance, a risk of the material being directed onto the host vehicle 2 by the motions of the at least first object 3—and/or onto the at least first object 3 by the motions of the host vehicle 2—may be calculated and/or derived from determined levels and/or amounts—and/or existence of occurrence—of the liquid and/or solid loose material relative a distance and/or distances of the at least first object 3 from the host vehicle 2 and/or heading directions of at least first object 3 and/or host vehicle 2. Such a risk may for instance further be based on accidentology data and/or statistical data covering historical scenarios of liquid and/or solid loose material having been directed onto vehicles—for instance resulting in at least partial opaqueness and/or obstruction of vehicle windshields and/or vehicle surrounding detecting sensors—during various liquid and/or solid loose material conditions and/or at various distances and/or vehicle heading directions. The at least first estimated upcoming host vehicle position 4, on the other hand, may be represented by any feasible one or more geographical positions and/or feasible trajectory at and/or during which there is deemed to be a risk of the at least first object 3 directing the material onto the host vehicle 2 and/or vice versa. The at least first estimated upcoming host vehicle position 4 may thus be positioned at any arbitrary feasible distance(s) from a current host vehicle position at which the at least first estimated upcoming host vehicle positions 4 was determined, such as within 100, 500 or 1000 metres therefrom. Similarly, the estimated upcoming at least first time instance Te may be represented by any feasible one or more time instances or time duration at and/or during which there is deemed to be a risk of the at least first object 3 directing the material onto the host vehicle 2 and/or vice versa. The estimated upcoming at least first time instance Te may thus occur at any arbitrary point or points in time from a current time instance Tc at which the estimated upcoming at least first time instance Te was determined, such as within 5, 30 or 60 seconds, and/or within a few minutes.

The phrase "determining based on the conditions and the movement attributes" may refer to "calculating and/or estimating based on the conditions and the movement attributes" and/or "determining using as input the conditions and the movement attributes". According to an example, "determining based on the conditions and the movement attributes" may further refer to "determining based on the conditions and the movement attributes and further based on accidentology data and/or statistical data covering historical scenarios of liquid and/or solid loose material being directed onto vehicles". The phrase "at least a first estimated upcoming host vehicle position", on the other hand, may refer to "one or more estimated upcoming host vehicle positions and/or an estimated upcoming host vehicle trajectory and/or path", whereas "occurring at an estimated upcoming at least first time instance" may refer to "pertinent and/or corresponding to an estimated upcoming at least first time instance" and/or "occurring at estimated upcoming one or more time instances and/or occurring during an estimated upcoming time duration and/or time frame". Moreover, "at which the at least first detected object is estimated to direct" may refer to "at which movement(s) and/or motion(s) of the at least first detected object is estimated to direct", whereas "direct the material onto the host vehicle" may refer to "direct at least a portion and/or fraction of the material onto the host vehicle" and/or "direct the material onto at least a portion of the host vehicle". According to an example, "direct the material onto the host vehicle" may further refer to "direct the material onto at least a front section and/or a side section of the host vehicle". Similarly, "the host vehicle is estimated to direct" may refer to "movement(s) and/or motion(s) of the host vehicle is estimated to direct", whereas "direct the material onto the at least first detected object" may refer to "direct at least a portion and/or fraction of the material onto the at least first detected object" and/or "direct the material onto at least a portion of the at least first detected object". According to an example, "direct the material onto the at least first detected object" may further refer to "direct the material onto at least a front section and/or a side section of the at least first detected object". Moreover, the phrase "at which the at least first detected object is estimated to direct the material onto the host vehicle and/or the host vehicle is estimated to direct the material onto the at least first detected object" may accordingly to an example refer to "at which the material is estimated to become a potential threat in interaction between the at least first detected object and the host vehicle".

As depicted in an exemplifying manner in FIGS. 1-7, the path-adapting system 1 is further—e.g. by means of a driving path determining unit 105—adapted and/or configured for determining a driving path 6 intended for the host vehicle 2, altering for the at least first time instance Te the at least first estimated upcoming host vehicle position 4 to a modified host vehicle position 7 mitigating the estimated directing of the material.

Thereby, there is established a trajectory 6 for the host vehicle 2 according to which the expected upcoming host vehicle position 4 is avoided and an altered position 7 for the host vehicle 2 suggested for the at least first time instance Te. Thus, with the proactive approach of the inventive concept, there is provided and/or generated a driving path 6 according to which the expected scenario and/or situation of the at least first object 3 directing liquid and/or solid loose material onto the host vehicle 2—and/or the host vehicle 2 directing the same onto the at least first object 3—at the at least first upcoming host vehicle position 4, may be avoided and/or alleviated. The mitigating the estimated directing of the material may range from fully avoiding liquid and/or solid loose material being directed onto the host vehicle 2 and/or the at least first object 3, to at least to some extent alleviating liquid and/or solid loose material being directed onto the host vehicle 2 and/or the at least first object 3. Moreover, the modified host vehicle position(s) 7—which may cover one or more positions—may be represented by any feasible geographical position(s), for instance further away from—and/or closer to—the at least first object 3 in a lateral and/or longitudinal direction. The driving path 6, on the other hand, may cover any feasible limited distance and/or range, for instance covering merely a few metres up to several thousand or tens of thousands of metres, and/or be valid during any feasible limited time frame—covering the estimated upcoming at least first time instance Te—for instance be valid during less than 10, 30 or 60 seconds or during less than several minutes. The driving path 6 may accordingly be applicable from a predeterminable point in time prior to the estimated upcoming at least first time instance Te to a predeterminable point in time subsequent the estimated upcoming at least first time instance Te, for instance within seconds or tens of seconds thereof, and/or within minutes thereof Furthermore, the driving path 6—along with the modified host vehicle position(s) 7—may be determined in any feasible manner—for instance deemed suitable, preferred, favourable and/or feasible—mitigating the estimated directing of the liquid and/or solid loose material onto the host vehicle 2 and/or the at least first object 3 at the at least first time instance Te, for instance while taking into account various impacting factors such as for instance remaining distance to the at least first estimated upcoming host vehicle position 4 and/or time remaining until the estimated upcoming at least first time instance Te, safety risks, extent or avoidance of jerking, occupant driving style preferences, etc. Optionally, the determining of a driving path 6 may comprise the modified host vehicle position 7 being adapted based on estimated risks associated with the host vehicle 2 being positioned at the at least first estimated upcoming host vehicle position 4 at the upcoming at least first time instance Te. Thereby, the modified host vehicle position(s) 7 may be selected taking into account severity associated with liquid and/or solid loose material being directed onto the host vehicle 2 and/or the at least first object 3 at the at least first time instance Te. Thus, differing risk factors associated therewith—for instance relating to estimated degree and/or extent of material being directed onto the host vehicle 2 and/or the at least first object 3, degree and/or extent to which the directed material is estimated to cover the host vehicle 2 and/or at least first object 3, structure and/or composition of the material, nearness and/or distance to other road users and/or objects, road conditions etc.—may render differing modified host vehicle position(s) 7 and subsequently differing driving paths 6. The phrase "estimated risks" may refer to "at least a first estimated risk" and further to "an estimated severity", whereas "the modified host vehicle position being adapted based on estimated risks" may refer to "the modified host vehicle position being selected taking into account estimated risks". Moreover, "estimated risks associated with the host vehicle" may refer to "determined and/or calculated risks associated with the host vehicle" and further to "estimated risks pertinent the host vehicle". According to an example, the phrase "wherein the determining a driving path comprises the modified host vehicle position being adapted based on estimated risks" may refer to "wherein the determining a driving path comprises the modified host vehicle position and the driving path being adapted based on estimated risks". Furthermore, the phrase "determining a driving path" may refer to "generating a driving path" and/or "determining a trajectory", and according to an example further to "determining a temporary driving path" and/or "determining a driving path applicable from a predeterminable point in time prior to the estimated upcoming at least first time instance to a predeterminable point in time subsequent the estimated upcoming at least first time instance". Moreover, "driving path intended for the host vehicle" may refer to "driving path applicable for the host vehicle", and according to an example further to "driving path intended for an ADS of the vehicle". The phrase "altering the at least first estimated upcoming host vehicle position", on the other hand, may refer to "altering a current host vehicle driving path and the at least first estimated upcoming host vehicle position" and/or "modifying, changing and/or adjusting the at least first estimated upcoming host vehicle position", whereas "a modified host vehicle position" may refer to "at least a first modified host vehicle position" and/or "an altered host vehicle position". Moreover, the phrase "mitigating the estimated directing of the material" may refer to "to less extent exposed, to a predeterminable extent less exposed and/or to no extent exposed to the estimated directing of the material" and/or "alleviating and/or avoiding the estimated directing of the material", and further to "mitigating the estimated directing of the material onto the host vehicle by the at least first detected object and/or the estimated directing of the material onto the at least first detected object by the host vehicle". According to an example, "modified host vehicle position mitigating the estimated directing of the material" may further refer to "modified host vehicle position having a greater longitudinal and/or lateral distance from the at least first detected object" and/or "modified host vehicle position out of reach or essentially out of reach of the estimated directing of the material".

In the following, the exemplifying suggested driving path 6 of FIGS. 1-7 will be described in further detail. It should be appreciated that although right-hand traffic scenarios are depicted, also left-hand traffic scenarios may be covered by the inventive concept. In exemplifying FIG. 1, there is in an exemplifying manner depicted that at the at least first time instance Te, the host vehicle 2 is at risk of the at least first object 3—here an overtaking vehicle—directing liquid and/or solid loose material—here represented by precipitation—onto the host vehicle 2, in that at the time instance(s) Te the at least first object 3 has an estimated lateral distance 41 from the host vehicle 2 in combination with an estimated longitudinal distance 42 from the host vehicle 2 at which it is estimated—based on the established conditions of sufficient amounts of liquid and/or solid loose material in the air and/or on the road surface and the established movement attributes of the at least first object 3—that the at least first object 3 is expected to direct the material onto the host vehicle 2. Thus, in view of exemplifying FIG. 1, there may hence in an exemplifying manner be determined a driving path 6 intended for the host vehicle 2, altering for the at least first time instance Te the at least first estimated upcoming host vehicle position 4 to a modified host vehicle position 7—here positioned at an increased lateral distance 71 from the at least first object 3—mitigating the estimated directing of the material. It should be appreciated that in addition to and/or as alternative to displacing the modified host vehicle position(s) 7 in an essentially lateral direction in comparison to the estimated upcoming host vehicle position(s) 4, the modified host vehicle position(s) 7 may additionally or alternatively be displaced in a longitudinal direction, and further be of any feasible magnitude.

Figure 2:
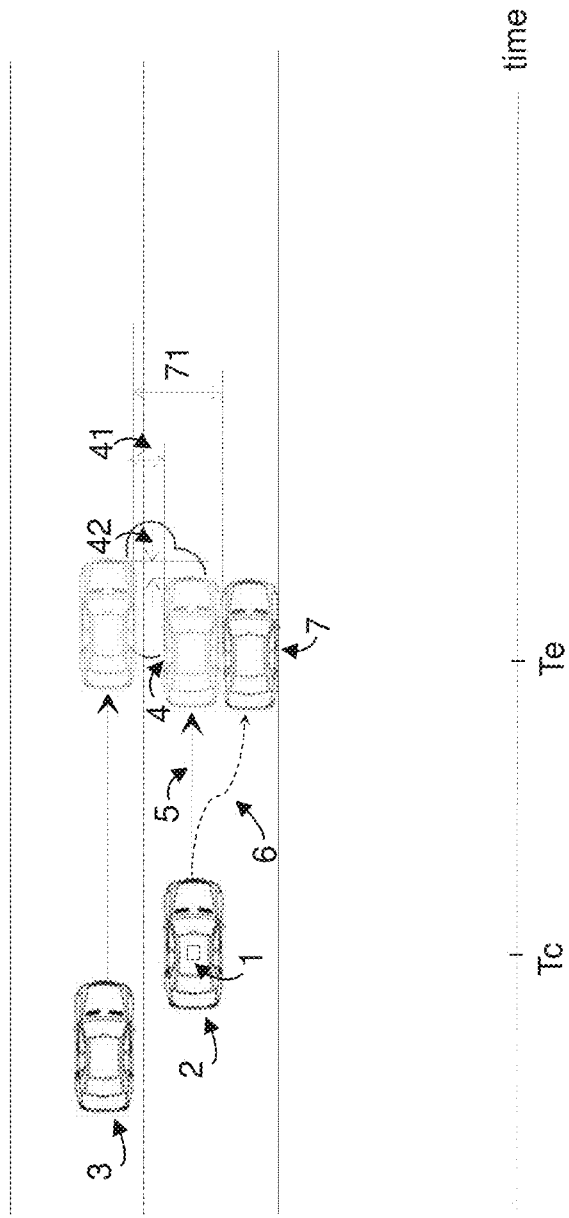
FIG. 2 illustrates a schematic view of an exemplifying path-adapting system according to embodiments of the disclosure in view of a second exemplifying driving scenario.

Similarly, in exemplifying FIG. 2, there is in an exemplifying manner depicted that at the at least first time instance Te, the host vehicle 2 is at risk of the at least first object 3—here an overtaking vehicle—directing liquid and/or solid loose material—here represented by, in addition and/or as an alternative to precipitation in the air, a pool of precipitation remaining on the road—onto the host vehicle 2, in that at the time instance(s) Te the at least first object 3 has an estimated lateral distance 41 from the host vehicle 2 in combination with an estimated longitudinal distance 42 from the host vehicle 2 at which it is estimated—based on the established conditions of sufficient level of liquid and/or solid loose material on the road surface and the established movement attributes of the at least first object 3—that the at least first object 3 is expected to direct the material onto the host vehicle 2. Thus, in view of exemplifying FIG. 2, there may hence in an exemplifying manner be determined a driving path 6 intended for the host vehicle 2, altering for the at least first time instance Te the at least first estimated upcoming host vehicle position 4 to a modified host vehicle position 7—here positioned at an increased lateral distance 71 from the at least first object 3—mitigating the estimated directing of the material. It should be appreciated that in addition to and/or as alternative to displacing the modified host vehicle position(s) 7 in an essentially lateral direction in comparison to the estimated upcoming host vehicle position(s) 4, the modified host vehicle position(s) 7 may—as similarly discussed in conjunction with FIG. 1—additionally or alternatively be displaced in a longitudinal direction, and further be of any feasible magnitude.

Figure 3:
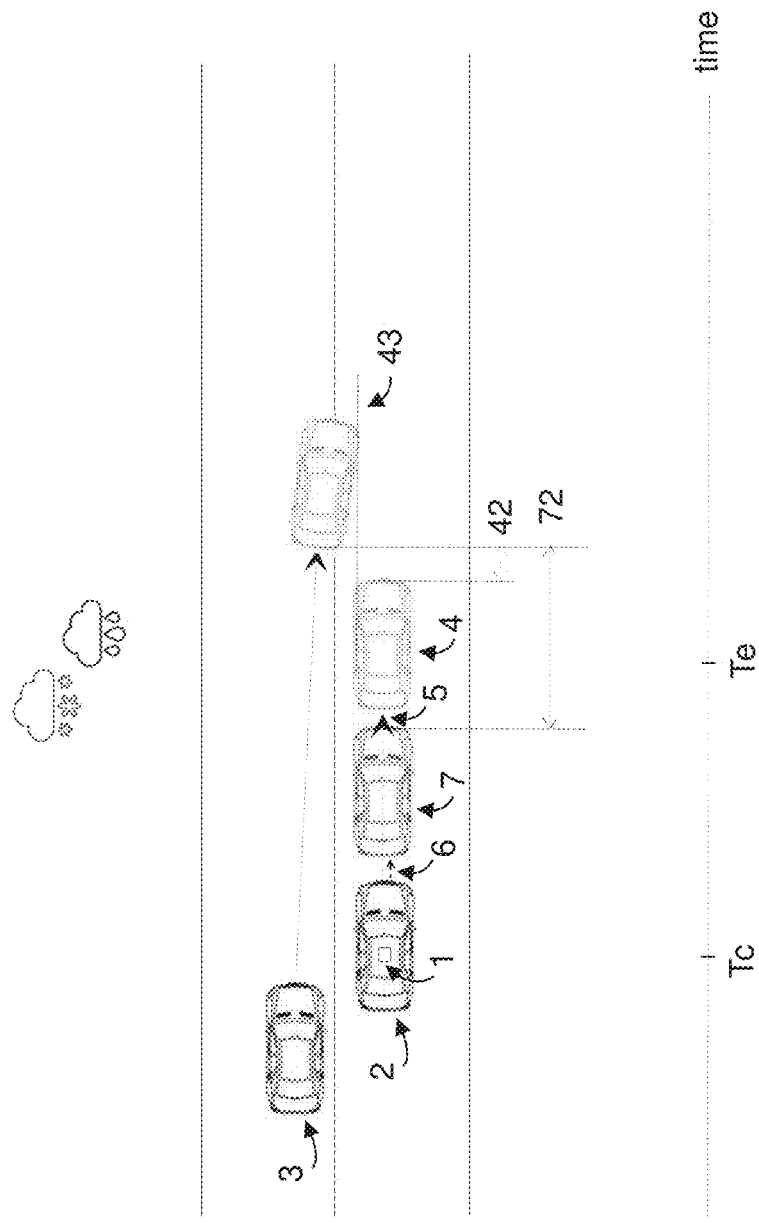
FIG. 3 illustrates a schematic view of an exemplifying path-adapting system according to embodiments of the disclosure in view of a third exemplifying driving scenario.

Moreover, in exemplifying FIG. 3, there is in an exemplifying manner depicted that at the at least first time instance Te, the host vehicle 2 is at risk of the at least first object 3—here represented by a cutting-in vehicle—directing liquid and/or solid loose material in the air and/or on the road surface—here represented by precipitation—onto the host vehicle 2, in that at the time instance(s) Te the at least first object 3 is estimated to intrude 43 on the host vehicle's 2 expected trajectory 5—e.g. on the side of the host vehicle 2 nearest the at least first object 3—in combination with being expected to be positioned at an estimated longitudinal distance 42 from the host vehicle 2 at which it is estimated—based on the established conditions of sufficient amounts of liquid and/or solid loose material in the air and/or on the road surface and the established movement attributes of the at least first object 3—that the at least first object 3 is expected to direct the material onto the host vehicle 2. Thus, in view of exemplifying FIG. 3, there may hence in an exemplifying manner be determined a driving path 6 intended for the host vehicle 2, altering for the at least first time instance Te the at least first estimated upcoming host vehicle position 4 to a modified host vehicle position 7—here positioned at an increased longitudinal distance 72 from the at least first object 3—mitigating the estimated directing of the material. It should be appreciated that in addition to and/or as alternative to displacing the modified host vehicle position(s) 7 in an essentially longitudinal direction in comparison to the estimated upcoming host vehicle position(s) 4, the modified host vehicle position(s) 7 may additionally or alternatively be displaced in a lateral direction, and further be of any feasible magnitude.

Figure 4:
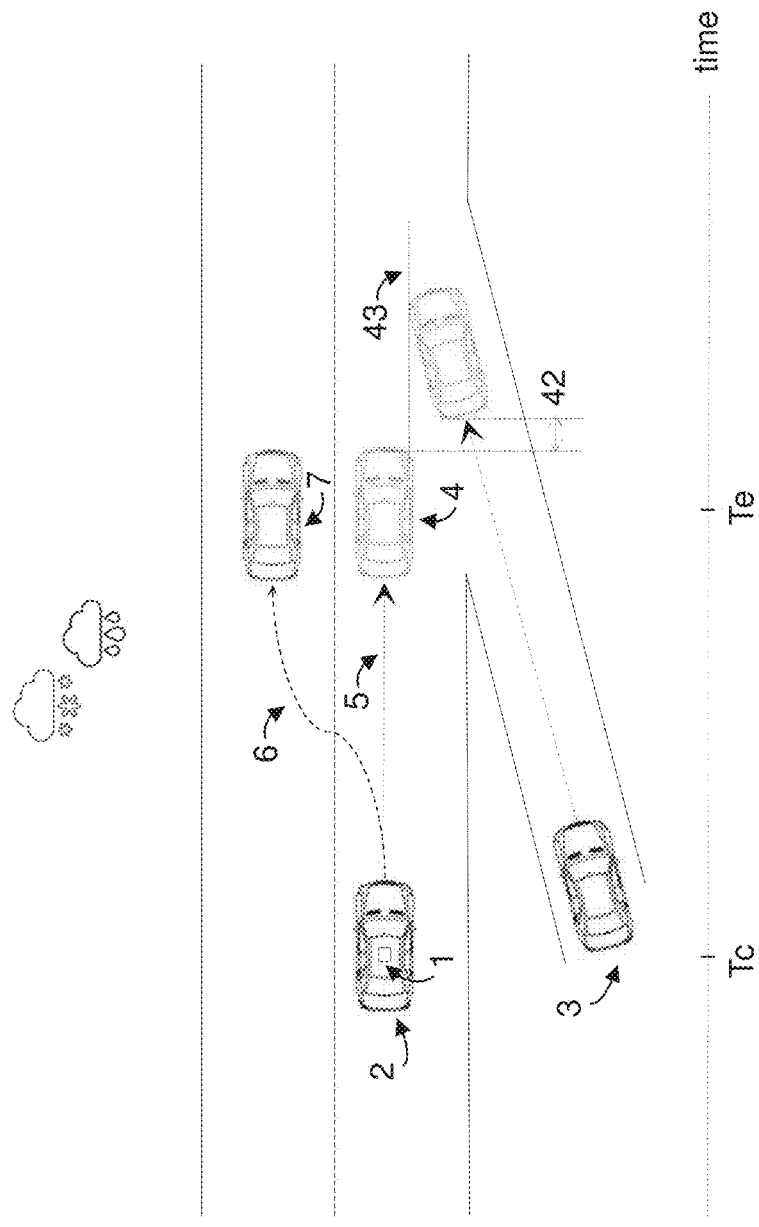
FIG. 4 illustrates a schematic view of an exemplifying path-adapting system according to embodiments of the disclosure in view of a fourth exemplifying driving scenario.

Similarly, in exemplifying FIG. 4, there is in an exemplifying manner depicted that at the at least first time instance Te, the host vehicle 2 is at risk of the at least first object 3—here represented by a lane-merging vehicle—directing liquid and/or solid loose material in the air and/or on the road surface—here represented by precipitation—onto the host vehicle 2, in that at the time instance(s) Te the at least first object 3 is estimated to intrude 43 on the host vehicle's 2 expected trajectory 5—e.g. on the side of the host vehicle 2 nearest the at least first object 3—in combination with being expected to be positioned at an estimated longitudinal distance 42 from the host vehicle 2 at which it is estimated—based on the established conditions of sufficient amounts of liquid and/or solid loose material in the air and/or on the road surface and the established movement attributes of the at least first object 3—that the at least first object 3 is expected to direct the material onto the host vehicle 2. Thus, in view of exemplifying FIG. 4, there may hence in an exemplifying manner be determined a driving path 6 intended for the host vehicle 2, altering for the at least first time instance Te the at least first estimated upcoming host vehicle position 4 to a modified host vehicle position 7—here positioned in a lane other than the current lane—mitigating the estimated directing of the material. It should be appreciated that in addition to and/or as alternative to displacing the modified host vehicle position(s) 7 in an essentially lateral direction in comparison to the estimated upcoming host vehicle position(s) 4, the modified host vehicle position(s) 7 may—as similarly discussed in conjunction with FIGS. 1 and 2—additionally or alternatively be displaced in a longitudinal direction, and further be of any feasible magnitude.

Figure 5:
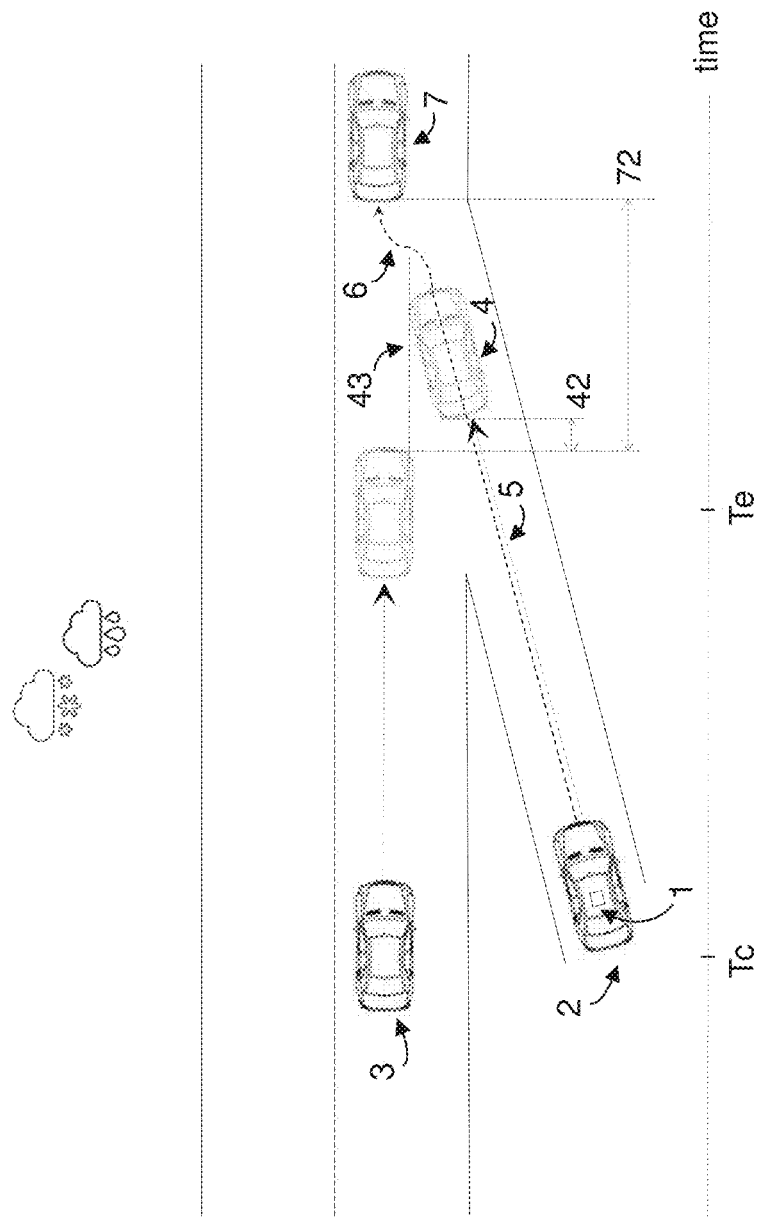
FIG. 5 illustrates a schematic view of an exemplifying path-adapting system according to embodiments of the disclosure in view of a fifth exemplifying driving scenario.

Correspondingly, in exemplifying FIG. 5, there is in an exemplifying manner depicted that at the at least first time instance Te, the host vehicle 2 is at risk of directing liquid and/or solid loose material in the air and/or on the road surface—here represented by precipitation—onto the at least first object 3—here represented by a vehicle in a lane into which the host vehicle 2 is expected to merge—in that at the time instance(s) Te the host vehicle 2 is estimated to intrude 43 on the at least first object's 3 expected trajectory—e.g. on the side of the at least first object 3 nearest the host vehicle 2—in combination with the host vehicle 2 being expected to be positioned at an estimated longitudinal distance 42 from the at least first object 3 at which it is estimated—based on the established conditions of sufficient amounts of liquid and/or solid loose material in the air and/or on the road surface and the established movement attributes of the at least first object 3 and/or the expected trajectory of the host vehicle 2—that the host vehicle 2 is expected to direct the material onto the at least first object 3. Thus, in view of exemplifying FIG. 5, there may hence in an exemplifying manner be determined a driving path 6 intended for the host vehicle 2, altering for the at least first time instance Te the at least first estimated upcoming host vehicle position 4 to a modified host vehicle position 7—here positioned at an increased longitudinal distance 72 from the at least first object 3—mitigating the estimated directing of the material. It should be appreciated that in addition to and/or as alternative to displacing the modified host vehicle position(s) 7 in an essentially longitudinal direction in comparison to the estimated upcoming host vehicle position(s) 4, the modified host vehicle position(s) 7 may—as similarly discussed in conjunction with FIG. 3—additionally or alternatively be displaced in a lateral direction, and further be of any feasible magnitude.

Moreover, in exemplifying FIG. 6, there is in an exemplifying manner depicted that at the at least first time instance Te, the host vehicle 2 is at risk of the at least first object 3—here an oncoming vehicle—directing liquid and/or solid loose material in the air and/or on the road surface—here represented by precipitation—onto the host vehicle 2 and/or of directing liquid and/or solid loose material onto the at least first object 3, in that at the time instance(s) Te when the host vehicle 2 and the at least first object 3 are expected to meet or essentially meet, the at least first object 3 has an estimated lateral distance 41 from the host vehicle 2 at which it is estimated—based on the established conditions of sufficient amounts of liquid and/or solid loose material in the air and/or on the road surface and the established movement attributes of the at least first object 3 and/or the expected trajectory of the host vehicle 2—that the at least first object 3 is expected to direct the material onto the host vehicle 2 and/or vice versa. Thus, in view of exemplifying FIG. 6, there may hence in an exemplifying manner be determined a driving path 6 intended for the host vehicle 2, altering for the at least first time instance Te the at least first estimated upcoming host vehicle position 4 to a modified host vehicle position 7—here positioned at an increased lateral distance 71 from the at least first object 3—mitigating the estimated directing of the material. It should be appreciated that in addition to and/or as alternative to displacing the modified host vehicle position(s) 7 in an essentially lateral direction in comparison to the estimated upcoming host vehicle position(s) 4, the modified host vehicle position(s) 7 may—as similarly discussed in conjunction with FIGS. 1, 2 and 4—additionally or alternatively be displaced in a longitudinal direction, and further be of any feasible magnitude.

Moreover, in exemplifying FIG. 7, there is in an exemplifying manner depicted that at the at least first time instance Te, the host vehicle 2 is at risk of the at least first object 3—here represented by a vehicle crossing on an overpass road—directing liquid and/or solid loose material in the air and/or on the road surface—here represented by precipitation—onto the host vehicle 2, in that at the time instance(s) Te the at least first object 3 is estimated to cross overhead the host vehicle's 2 expected trajectory 5 in combination with being expected to be positioned at an estimated longitudinal distance 42 from the host vehicle 2 at which it is estimated—based on the established conditions of sufficient amounts of liquid and/or solid loose material in the air and/or on the road surface and the established movement attributes of the at least first object 3—that the at least first object 3 is expected to direct the material down onto the host vehicle 2. Thus, in view of exemplifying FIG. 7, there may hence in an exemplifying manner be determined a driving path 6 intended for the host vehicle 2, altering for the at least first time instance Te the at least first estimated upcoming host vehicle position 4 to a modified host vehicle position 7—here positioned at an increased longitudinal distance 72 from the at least first object 3—mitigating the estimated directing of the material. It should be appreciated that in addition to and/or as alternative to displacing the modified host vehicle position(s) 7 in an essentially longitudinal direction in comparison to the estimated upcoming host vehicle position(s) 4, the modified host vehicle position(s) 7 may additionally or alternatively be displaced in a lateral direction, and further be of any feasible magnitude.

According to the inventive concept, a determined driving path 6—and/or a planned activation and/or implementation thereof—may be provided, communicated, presented, implemented and/or generated in any feasible manner, such as audibly within the host vehicle 2 e.g. with support from loud speaker(s) and/or with haptic feedback to a potential vehicle driver. Optionally, however, additionally or alternatively—and as depicted in an exemplifying manner in FIG. 8—the path-adapting system 1 may—e.g. by means of an optional path providing unit 106—be adapted and/or configured for providing with support from a display 24 onboard the host vehicle 2, a graphical representation indicative of at least a portion of the driving path 6. Thereby, the determined driving path 6 may be presented and/or displayed visually to a potential vehicle occupant, such as a driver thereof. Thus, the potential vehicle occupant may accordingly be made aware of the driving path 6 suggested to mitigate the estimated directing of the liquid and/or solid loose material, and if in a manual driving mode inspired and/or instructed to follow through on the suggested driving path 6. The display 24 may refer to one or more displays associated with, connected to and/or integrated with the host vehicle 2, and further be represented by any feasible—e.g. known—digital display, such as for instance a head-up display, HUD, and/or a display provided in conjunction with for instance a centre stack, instrument panel, dashboard, cluster or the like. The graphical representation indicative of at least a portion of the driving path 6, on the other hand, may be represented by any feasible graphics and/or illustrations mimicking and/or illustrative of the determined driving path 6, for instance by presenting a graphical representation corresponding to the driving path 6 in relation to graphical representation(s) corresponding to the host vehicle 2, the at least first object 3, potential lane and/or road markings and/or the liquid and/or solid loose material.

Further optionally, additionally or alternatively, the path-adapting system 1 may—e.g. by means of an optional driving path signal generating unit 107—be adapted and/or configured for generating a driving path signal indicative of the driving path 6 for actuating—prior to the at least first time instance Te—the driving path 6 with support from an ADS 21 of the host vehicle 2, by means of one or more driving manoeuvres comprising steering, decelerating and/or accelerating the host vehicle 2. Thereby, the determined driving path 6 may be provided to and carried out by an ADS 21 of the host vehicle 2 by a combination of adapted steering, acceleration and/or deceleration of the host vehicle 2, thus enabling for the host vehicle 2 to follow through on the driving path 6 mitigating the estimated directing of the liquid and/or solid loose material. In exemplifying FIGS. 1, 2, 4 and 6, respective driving path 6 involves adjusted steering in an exemplifying manner, whereas in exemplifying FIGS. 3, 5 and 7, respective driving path 6 involves adjusted acceleration or deceleration in an exemplifying manner. Once the driving path 6 is followed through, control of the host vehicle 2 may be resumed and/or returned, for instance to the drive mode utilized prior to actuation of the driving path 6, further for instance to an automated mode of the ADS 21 and/or manual mode of a potential vehicle driver, and/or further for instance to a trajectory and/or path valid prior to the actuation of the driving path 6. The phrase "driving path signal" may refer to "driving path instructions", whereas "driving path signal indicative of the driving path" may refer to "driving path signal comprising the driving path". Moreover, "for actuating, prior to the at least first time instance, the driving path" may refer to "for actuating, prior to the at least first time instance, by overriding a current drive mode and/or driving path, the driving path", whereas "actuating" may refer to "activating". The phrase "by means of one or more driving manoeuvres", on the other hand, may refer to "with support from and/or by utilizing of one or more driving manoeuvres" and/or "adapting one or more driving manoeuvres".

Moreover, optionally, and as depicted in an exemplifying manner in FIG. 8, the path-adapting system 1 may—e.g. by means of an optional driver attentiveness determining unit 104—be adapted and/or configured for determining a driver attentiveness level of a potential driver of the host vehicle 2 based on obtained driver state data. The determining a driving path 6 may then comprise adapting the driving path 6 based on the driver attentiveness level. Additionally, or alternatively, optionally, the generating of a driving path signal may then comprise adapting timing of the actuating and/or level of applied steering/braking torque comprised in the driving path signal based on the driver attentiveness level. Thereby, taking into consideration an established level of driving situation attentiveness of a potential vehicle driver, for instance a driver state such as level of awareness, drowsiness, drunkenness etc., for instance gathered with support from one or more—e.g. known—driver monitoring cameras 25 and/or driver behaviour sensors and/or algorithms, the driving path 6—such as one or more of its characteristics and/or parameters—and/or the actuation timing and/or level of steering and/or torque for implementing the driving path 6, may be adapted in view thereof. For instance, driver attentiveness of a certain level—which level for instance range from the potential driver e.g. being fully aware to the potential driver being totally unaware—may equate to the driving path 6 and/or the modified host vehicle position 7—and/or the actuation timing and/or level of steering and/or torque for implementing the driving path 6—being selected differently as compared to should the driver attentiveness be of another level. The phrase "determining a driver attentiveness level" may refer to "estimating and/or deriving a driver attentiveness level", whereas "based on obtained driver state data" may refer to "based on obtained driver attentiveness data", "from, calculated from and/or derived from obtained driver state data" and/or "based on obtained driver state information". Moreover, "based on obtained driver state data" may according to an example further refer to "based on obtained driver state data gathered with support from one or more driver monitoring cameras and/or driver behaviour sensors". The phrase "adapting [ . . . ] based on the driver attentiveness level", on the other hand, may refer to "adapting [ . . . ] in view of and/or in consideration of the driver attentiveness level", whereas "adapting the driving path" may refer to "adapting the driving path and the modified host vehicle position".

As further shown in FIG. 8, which is a schematic block diagram illustrating an exemplifying path-adapting system 1 according to embodiments of the disclosure, the path-adapting system 1 comprises a conditions determining unit 101, a movement determining unit 102, an upcoming risk determining unit 103, an optional driver attentiveness determining unit 104, a driving path determining unit 105, an optional path providing unit 106 and an optional driving path signal generating unit 107, all of which already have been described in greater detail above. Furthermore, the embodiments herein for precautionary path planning of a host vehicle 2, may be implemented through one or more processors, such as at least a first processor 108—for instance at least a first central processing unit, CPU—together with computer program code for performing the functions and actions of the embodiments herein. The program code may also be provided as one or more computer program products, for instance in the form of at least a first data carrier carrying computer program code for performing the embodiments herein when being loaded into the path-adapting system 1. One such carrier may be in the form of at least a first CD/DVD ROM disc and/or at least a first hard drive, it is however feasible with other data carriers. The computer program code may furthermore be provided as pure program code on a server and downloaded to the path-adapting system 1. The path-adapting system 1 may further comprise at least a first memory 109 comprising one or more memory units. The memory 109 optionally includes high-speed random access memory, such as DRAM, SRAM, DDR RAM, or other random access solid-state memory devices, and further optionally includes non-volatile memory, such as one or more magnetic disk storage devices, optical disk storage devices, flash memory devices, or other non-volatile solid-state storage devices. Moreover, the memory 109 may be arranged to be used to store e.g. information, and further to store data, configurations, schedulings, and applications, to perform the methods herein when being executed in the path-adapting system 1. For instance, the computer program code may be implemented in the firmware, stored in FLASH memory 109 of at least a first embedded processor 108, and/or downloaded wirelessly e.g. from an off-board server. Furthermore, the units 101-107, the optional at least first processor 108 and/or the optional at least first memory 109, may be comprised in an arrangement at least partly comprised in one or more nodes 110 e.g. ECUs of the host vehicle 2, e.g. in and/or in association with the optional ADS 21. Those skilled in the art will also appreciate that the units 101-107 described above as well as any other unit, interface, system, controller, module, device, element, feature, or the like described herein may refer to, comprise, include, and/or be implemented in or by a combination of analog and digital circuits, and/or one or more processors configured with software and/or firmware, e.g. stored in one or more memories such as the at least first memory 109, that when executed by the one or more processors such as the at least first processor 108 perform as described herein. One or more of these processors, as well as the other digital hardware, may be included in a single Application-Specific Integrated Circuitry, ASIC, or several processors and various digital hardware may be distributed among several separate components, whether individually packaged or assembled into a System-on-a-Chip, SoC.

Figure 9:
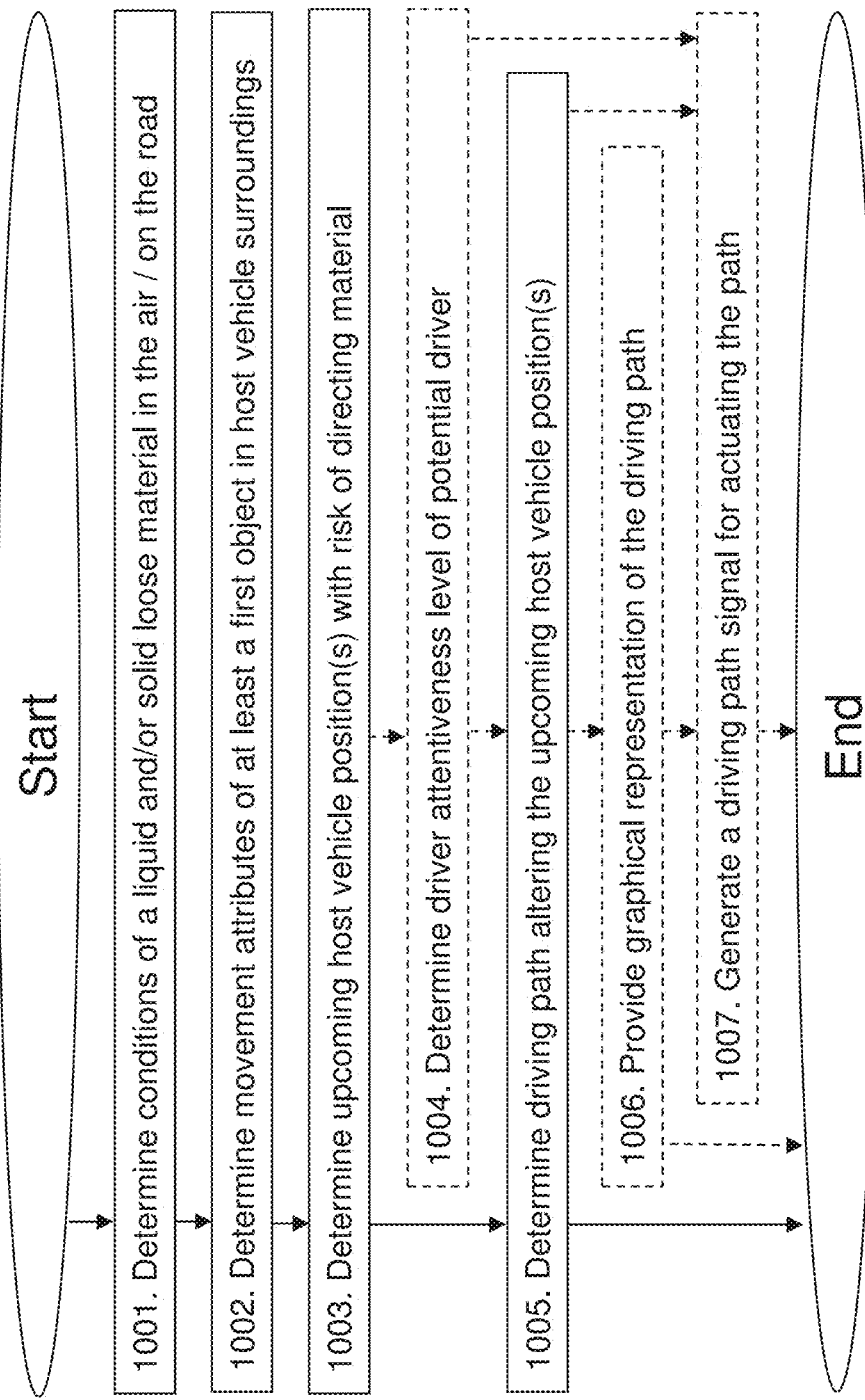
FIG. 9 is a flowchart depicting an exemplifying method performed by a path-adapting system according to embodiments of the disclosure.

FIG. 9 is a flowchart depicting an exemplifying method performed by a path-adapting system 1 according to embodiments of the disclosure. The method is for precautionary path planning of a host vehicle 2. The exemplifying method, which may be continuously repeated, comprises one or more of the following actions discussed with support from FIGS. 1-8. Moreover, the actions may be taken in any suitable order and/or one or more actions may be performed simultaneously and/or in alternate order where applicable. For instance, Actions 1001 and 1002 may be performed simultaneously or in alternate order.

Action 1001

In Action 1001, the path-adapting system 1 determines— e.g. with support from the conditions determining unit 101—conditions of a liquid and/or solid loose material in the air and/or on the road surface in vicinity of the host vehicle 2, based on collected input data.

Action 1002

In Action 1002, the path-adapting system 1 determines— e.g. with support from the movement determining unit 102—movement attributes in relation to the host vehicle 2, of at least a first object 3 in host vehicle surroundings captured with support from one or more surrounding detecting sensors 23 onboard the host vehicle 2.

Action 1003

In Action 1003, the path-adapting system 1 determines— e.g. with support from the upcoming risk determining unit 103—based on the conditions and the movement attributes, at least a first estimated upcoming host vehicle position 4 occurring at an estimated upcoming at least first time instance Te at which the at least first detected object 3 is estimated to direct the material onto the host vehicle 2 and/or the host vehicle 2 is estimated to direct the material onto the at least first detected object 3.

Optionally, Action 1003 of determining at least a first estimated upcoming host vehicle position 4 may comprise— and/or the upcoming risk determining unit 103 may be adapted and/or configured for—determining at least a first estimated upcoming host vehicle position 4 at which the at least first detected object 3 is estimated to direct the material onto at least a portion of a windshield of the host vehicle 2 and/or the host vehicle 2 is estimated to direct the material onto at least a portion of a windshield of the at least first detected object 3.

Action 1004

In optional Action 1004, the path-adapting system 1 may determine—e.g. with support from the optional driver attentiveness determining unit 104—a driver attentiveness level of a potential driver of the host vehicle 2 based on obtained driver state data.

Action 1005

In Action 1005, the path-adapting system 1 determines— e.g. with support from the driving path determining unit 105—a driving path 6 intended for the host vehicle 2, altering for the at least first time instance Te the at least first estimated upcoming host vehicle position 4 to a modified host vehicle position 7 mitigating the estimated directing of the material.

Optionally, Action 1005 of determining a driving path 6 may comprise—and/or the path determining unit 105 may be adapted and/or configured for—the modified host vehicle position 7 being adapted based on estimated risks associated with the host vehicle 2 being positioned at the at least first estimated upcoming host vehicle position 4 at the upcoming at least first time instance Te.

Further optionally, should Action 1005 be preceded by optional Action 1004 of determining a driver attentiveness level, then Action 1005 of determining a driving path 6 may comprise—and/or the path determining unit 105 may be adapted and/or configured for—adapting the driving path 6 based on the driver attentiveness level.

Action 1006

In optional Action 1006, the path-adapting system 1 may provide—e.g. with support from the optional path providing unit 106—with support from a display 24 onboard the host vehicle 2, a graphical representation indicative of at least a portion of the driving path 6.

Action 1007

In optional Action 1007, the path-adapting system 1 may generate—e.g. with support from the optional driving path signal generating unit 107—a driving path signal indicative of the driving path 6 for actuating, prior to the at least first time instance Te, the driving path 6 with support from an ADS 21 of the host vehicle 2, by means of one or more driving manoeuvres comprising steering, decelerating and/ or accelerating the host vehicle 2.

Optionally, should optional Action 1007 be preceded by optional Action 1004 of determining a driver attentiveness level, then Action 1007 of generating a driving path signal may comprise—and/or the optional driving path signal generating unit 107 may be adapted and/or configured for—adapting timing of the actuating and/or level of applied steering/braking torque comprised in the driving path signal based on the driver attentiveness level.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

The invention claimed is:

1. A method performed by a path-adapting system for precautionary path planning of a host vehicle, the method comprising:
   determining conditions of at least one of a liquid and solid loose material in at least one of the air and on the road surface in vicinity of the host vehicle based on collected input data;
   determining movement attributes, in relation to the host vehicle, of at least a first object in host vehicle surroundings captured with support from one or more surrounding detecting sensors onboard the host vehicle, the at least first object being another vehicle;
   determining based on the conditions and the movement attributes, at least a first estimated upcoming host vehicle position occurring at an estimated upcoming at least a first time instance at which the host vehicle is estimated to direct the material onto the at least first object;

determining a driving path intended for the host vehicle, altering for the at least first time instance, the at least first estimated upcoming host vehicle position to a modified host vehicle position mitigating the estimated directing of the material;

providing, with support from a display onboard the host vehicle, a graphical representation indicative of at least a portion of the driving path in relation to a graphical representation of the host vehicle and both of the at least first object and the material; and causing an automated driving system, ADS, of the host vehicle, or allowing a driver thereof, to control the host vehicle according to the driving path.

2. The method according to claim 1, wherein the determining of at least the first estimated upcoming host vehicle position comprises determining at least a first estimated upcoming host vehicle position at which the at least first object is at least one of:

estimated to direct the material onto at least a portion of a windshield of the host vehicle; and the host vehicle is estimated to direct the material onto at least a portion of a windshield of the at least first object.

3. The method according to claim 2, further comprising:

determining a driver attentiveness level of a potential driver of the host vehicle based on obtained driver state data, the determining of the driving path then comprising adapting the driving path based on the driver attentiveness level.

4. The method according to claim 1, further comprising:

generating a driving path signal indicative of the driving path for actuating, prior to the at least first time instance, the driving path with support from the ADS by means of one or more driving manoeuvres comprising at least one of steering, decelerating and accelerating the host vehicle.

5. The method according to claim 4, further comprising at least one of:

determining a driver attentiveness level of a potential driver of the host vehicle based on obtained driver state data, the determining of the driving path then comprising adapting the driving path based on the driver attentiveness level; and the generating of the driving path signal then comprising adapting timing of at least one of the actuating and level of applied steering/braking torque comprised in the driving path signal based on the driver attentiveness level.

6. The method according to claim 1, further comprising:

determining a driver attentiveness level of a potential driver of the host vehicle based on obtained driver state data, the determining of the driving path then comprising adapting the driving path based on the driver attentiveness level.

7. The method according to claim 1, wherein the determining of the driving path comprises the modified host vehicle position being adapted based on estimated risks associated with the host vehicle being positioned at the at least first estimated upcoming host vehicle position at the upcoming at least first time instance.

8. A path-adapting system for precautionary path planning of a host vehicle, the path-adapting system comprising:

a processor configured to:

determine conditions of at least one of a liquid and solid loose material at least one of in the air and on the road surface in vicinity of the host vehicle based on collected input data;

determine movement attributes in relation to the host vehicle, of at least a first object in host vehicle surroundings captured with support from one or more surrounding detecting sensors onboard the host vehicle, the at least first object being another vehicle;

determine based on the conditions and the movement attributes, at least a first estimated upcoming host vehicle position occurring at an estimated upcoming at least a first time instance at which the host vehicle is estimated to direct the material onto the at least first object;

determine a driving path intended for the host vehicle, altering for the at least first time instance, the at least first estimated upcoming host vehicle position to a modified host vehicle position mitigating the estimated directing of the material; and provide, with support from a display onboard the host vehicle, a graphical representation indicative of at least a portion of the driving path in relation to a graphical representation of the host vehicle and both of the at least first object and the material; and cause an automated driving system, ADS, of the host vehicle, or allowing a driver thereof, to control the host vehicle according to the driving path.

9. The path-adapting system according to claim 8, wherein the processor is configured to determine at least the first estimated upcoming host vehicle position at which the at least first object is at least one of:

estimated to direct the material onto at least a portion of a windshield of the host vehicle; and the host vehicle is estimated to direct the material onto at least a portion of a windshield of the at least first object.

10. The path-adapting system according to claim 9, wherein the processor is further configured to:

determine a driver attentiveness level of a potential driver of the host vehicle based on obtained driver state data; and adapt the driving path based on the driver attentiveness level.

11. The path-adapting system according to claim 8, wherein the processor is further configured to:

generate a driving path signal indicative of the driving path for actuating, prior to the at least first time instance, the driving path with support from the ADS by means of one or more driving manoeuvres comprising at least one of steering, decelerating and accelerating the host vehicle.

12. The path-adapting system according to claim 11, wherein the processor is further configured to at least one of:

determine a driver attentiveness level of a potential driver of the host vehicle based on obtained driver state data;

adapt the driving path based on the driver attentiveness level; and adapt timing of at least one of the actuating and level of applied steering/braking torque comprised in the driving path signal based on the driver attentiveness level.

13. The path-adapting system according to claim 8, wherein the processor is further configured to:

determine a driver attentiveness level of a potential driver of the host vehicle based on obtained driver state data; and adapt the driving path based on the driver attentiveness level.

14. The path-adapting system according to claim 8, wherein the processor is configured for the modified host vehicle position to be adapted based on estimated risks associated with the host vehicle being positioned at the at least first estimated upcoming host vehicle position at the upcoming at least first time instance.

15. The path-adapting system according to claim 8, wherein the path-adapting system is comprised in a vehicle.

16. A non-transitory computer storage medium storing a computer program that when executed causes one of a computer and a processor perform a method for precautionary path planning of a host vehicle, the method comprising:

determining conditions of at least one of a liquid and solid loose material in at least one of the air and on the road surface in vicinity of the host vehicle based on collected input data;

determining movement attributes in relation to the host vehicle, of at least a first object in host vehicle surroundings captured with support from one or more surrounding detecting sensors onboard the host vehicle, the at least first object being another vehicle;

determining based on the conditions and the movement attributes, at least a first estimated upcoming host vehicle position occurring at an estimated upcoming at least a first time instance at which the host vehicle is estimated to direct the material onto the at least first object;

determining a driving path intended for the host vehicle, altering for the at least first time instance, the at least first estimated upcoming host vehicle position to a modified host vehicle position mitigating the estimated directing of the material;

providing, with support from a display onboard the host vehicle, a graphical representation indicative of at least a portion of the driving path in relation to a graphical representation of the host vehicle and both of the at least first object and the material; and causing an automated driving system, ADS, of the host vehicle, or allowing a driver thereof, to control the host vehicle according to the driving path.

\* \* \* \* \*